(12) United States Patent
Dickinson et al.

(10) Patent No.: US 6,263,585 B1
(45) Date of Patent: Jul. 24, 2001

(54) CALIPER PROBE-MEASURING DEVICE

(76) Inventors: Ansel Reed Dickinson, 1705 Stonehenge Dr., Tustin, CA (US) 92780; Richard E. Trillwood, 1514 C E. Edinger Ave., Santa Ana, CA (US) 92705-4918

( * ) Notice: Subject to any disclaimer, the term of this patent is extended or adjusted under 35 U.S.C. 154(b) by 0 days.

(21) Appl. No.: 09/324,740

(22) Filed: Jun. 3, 1999

(51) Int. Cl.[7] .............. G01B 3/28; G01B 3/38; G01B 5/18; G08B 21/00

(52) U.S. Cl. ............... 33/836; 33/783; 33/810; 33/832; 33/833; 33/542; 340/678; 340/686.5

(58) Field of Search ............... 33/832, 833, 836, 33/783, 784, 810, 811, 812, 542, 792, 806; 340/680, 678, 686.5; 248/157, 161, 172, 419

(56) References Cited

U.S. PATENT DOCUMENTS

| | | | |
|---|---|---|---|
| 484,567 | * 10/1892 | Broadbooks | 33/806 |
| 490,860 | * 1/1893 | Snoeck | 33/836 |
| 1,329,911 | * 2/1920 | Lenti | 33/810 |
| 1,516,631 | * 11/1924 | D'Erville | 33/810 |
| 1,663,217 | * 3/1928 | Ryan | 33/810 |
| 1,795,296 | * 3/1931 | De Zeng | 248/157 |
| 2,324,998 | * 7/1943 | Dague | 33/542 |
| 2,667,631 | * 1/1954 | Schaurte | 340/678 |
| 2,945,660 | * 7/1960 | Slavsky et al. | 248/161 |
| 3,334,419 | * 8/1967 | Jaye | 33/832 |
| 3,355,811 | * 12/1967 | Tailleur | 33/542 |
| 3,645,002 | * 2/1972 | Hefti | 33/833 |
| 3,981,468 | * 9/1976 | Holan | 248/172 |
| 4,272,821 | 6/1981 | Bradus . | |
| 4,383,369 | 5/1983 | Newton . | |
| 4,516,326 | * 5/1985 | Calcagno, Jr. | 33/542 |
| 4,577,412 | 3/1986 | McKinney . | |
| 4,622,752 | 11/1986 | Harra . | |
| 4,776,102 | 10/1988 | Carroll . | |
| 4,817,903 | * 4/1989 | Braehler et al. | 248/157 |
| 5,036,596 | 8/1991 | Goury et al. . | |
| 5,235,756 | 8/1993 | Wickenhaver . | |
| 5,235,988 | * 8/1993 | Johnson et al. | 33/836 |
| 5,343,624 | * 9/1994 | Symons | 33/810 |
| 5,491,907 | * 2/1996 | Vidmar | 33/832 |
| 5,901,458 | * 5/1999 | Andermo et al. | 33/784 |

FOREIGN PATENT DOCUMENTS

440732 * 5/1912 (FR) ..................... 33/812

* cited by examiner

*Primary Examiner*—Diego Gutierrez
(74) *Attorney, Agent, or Firm*—Price and Gess

(57) ABSTRACT

The present invention relates generally to measuring devices, namely calipers. The invention is a measuring device for measuring the height or depth of a conductive element comprising a stabilizing body comprising a beam; at least one leg extending from said beam; a contact affixed to at least one leg, an electrical energy source connected in series with said contact; an indicator connected in series with said electrical energy source and said contact; a caliper comprising a measuring scale; a probe, said probe connected in series with said contact, said electrical energy source, said indicator; and means for affixing the caliper to the beam. The invention satisfies the need for a caliper probe measuring device which provides the advantages of calipers but also is stable, indicates contact with the object to be measured, and can measure the height and depth of various objects not easily measurable by calipers with repeatable accuracy 5 Claims, 2 Drawing Sheets FIG. 3
FIG. 4
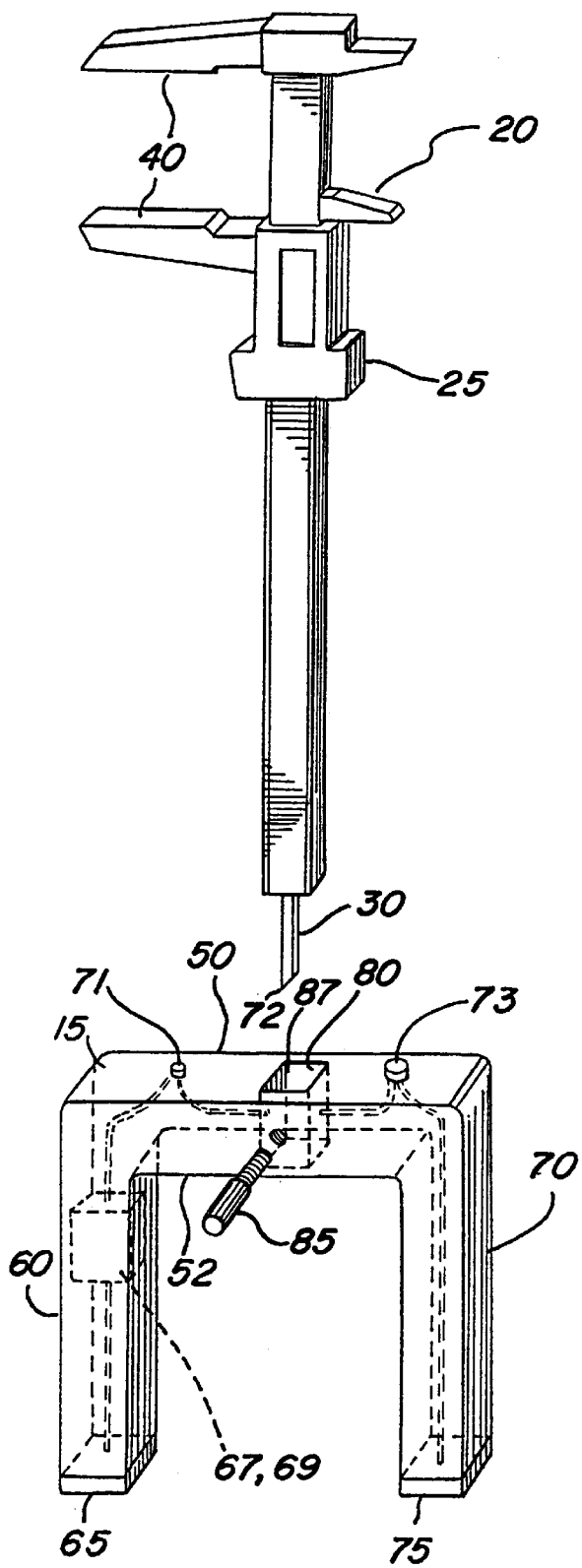
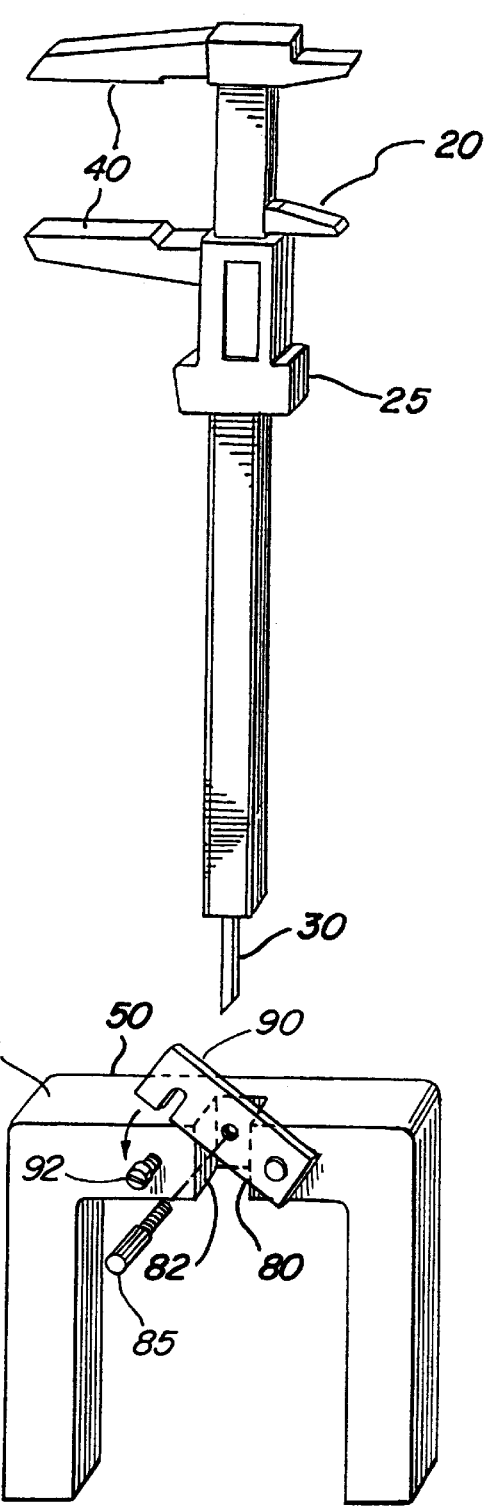

CALIPER PROBE-MEASURING DEVICE

BACKGROUND OF THE INVENTION

1. Technical Field

The present invention relates generally to measuring devices, namely calipers.

2. Background Art

Various prior art devices exist for the measurement of the height and depth of objects including standard calipers. However, calipers are not stable devices that can stand in place during measurement. Instead, the user must hold and manipulate the calipers while taking a measurement. Such instability creates undesirable measurement error. The user is also unable to perform fine measurements where contact with the object to be measured is not readily discernible.

Moreover, the size and angle of the measurement arms of calipers prevent measurement of various objects and dies. For example, the depth of a hole or mold or the height of a protrusion from a larger object cannot be easily and accurately measured with calipers.

Accordingly, there is a need for a caliper probe measuring device which provides the advantages of calipers but also is stable, indicates contact with the object to be measured, and can measure the height and depth of various objects not easily measurable by calipers with repeatable accuracy.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which like reference numbers indicate like parts throughout the drawings, and wherein:

FIG. 3 is a perspective view of an alternative embodiment of the invention; and, FIG. 4 is a perspective view of another alternative embodiment of the invention.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a caliper probe-measuring device.

Figure 1:
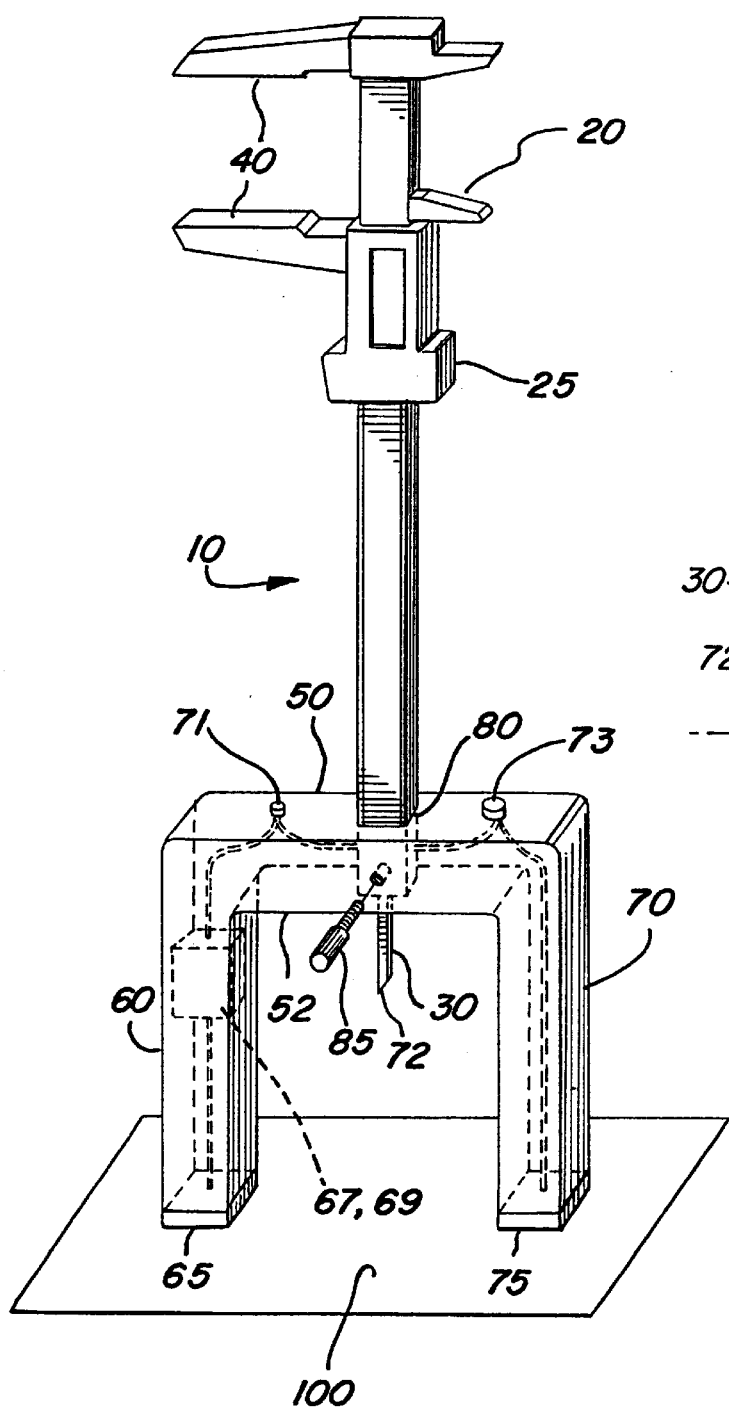
FIG. 1 is a perspective view of a preferred embodiment of the invention.

Referring now to FIG. 1, the caliper probe-measuring device 10 comprises a caliper 20. In the preferred embodiment depicted, the caliper 20 has a digital read-out 25. An analog caliper can be used as well. However, the caliper 20 must have a probe 30 opposite the measurement arms 40. An alternative embodiment of the invention is that the probe 30 can be of extendible as opposed to a fixed length.

The caliper probe-measuring device 10 of FIG. 1 further comprises a U-shaped structure having a beam 50 and two legs 60 and 70. The legs 60, 70 extend downward from the beam 50. In the preferred embodiment, the legs 60, 70 extend parallel to each other and perpendicular to the beam 50. However, the legs 60, 70 can extend down at an angle so long as the beam 50 is stabilized when the probe-measuring device 10 is placed on a surface 100.

In the preferred embodiment depicted, the beam 50 and legs 60, 70 are contiguously formed from a single material. A non-conductive material such as plastic is preferred. However, a contiguous body is not required. The legs 60, 70 can be connected to the underside of the beam 52.

In the preferred embodiment, the beam 50 further comprises an attachment port 80 that extends through the thickness of the beam 50. The port can be placed anywhere along the length of the beam 50. In the preferred embodiment, the port 80 is centered between the two legs 60, 70. The caliper 20 is placed in the attachment port 80 and affixed to the beam 50. In the preferred embodiment, a clamp screw 85 is used. However, the caliper 20 can alternatively be affixed by a force fit with the attachment port 80, a nut and bolt assembly, a clip, adhesive, a pneumatic grip, or any other suitable attachment means so long as the attachment port 80 makes conductive contact with the probe 30.

In the preferred embodiment, the leg 60 has a first contact 65 and the leg 70 has a second contact 75. Each contact 65, 75 is made of an electrically conducting material such as brass. Looking to the circuit schematic in FIG. 2, it is noted that the first contact 65 and the second contact 75 are connected in parallel.

Both contacts 65, 75 are connected in series with a switch 73, an electrical energy source 67, such as a battery or solar cell, and an indicator 71, such as a light emitting diode (LED). The indicator 71 can also be a RF audio or infrared transmitter.

The electrical energy source 67 and indicator 71 are connected in series with a resistor 69. The resistor 69 can be changed depending on the conductivity of the object to be measured. The preferred embodiment has a switch 73 connected in series with the indicator 71 so that the device 10 can be turned on and off.

Figure 2:
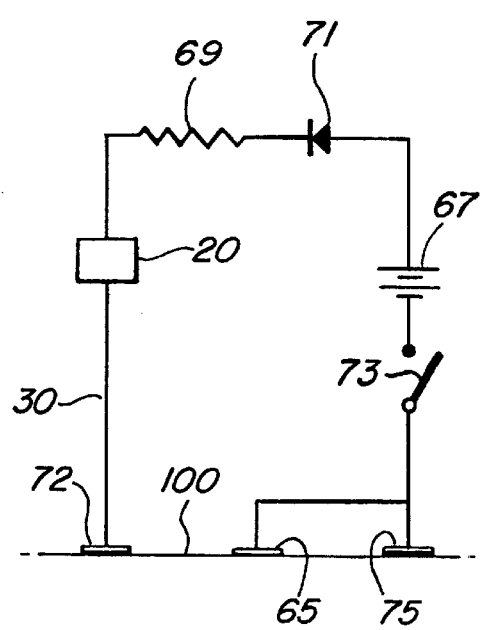
FIG. 2 is a schematic of the circuit contained within the preferred embodiment depicted in FIG. 1.

The attachment port 80 is connected to the circuit in FIG. 2 in series with the resistor 69, the indicator 71, the electrical energy source 67, the switch 73, and the parallel contacts 65 and 75. The probe 30 with its contact 72 is insulated from the contacts 65, 75, preferably with an insulating sheath, until it comes in contact with the object to be measured wherein the circuit described in FIG. 2 is closed by the object to be measured.

The preferred embodiment of the caliper probe-measuring device 10 is used as follows: The first contact 65 and second contact 75 are placed on an electrically conductive surface 100. The probe 30 with its contact 72 is lowered until it reaches the conductive surface 100. When the probe 30 contacts the surface 100, the circuit is closed and the indicator 71 is activated. For the preferred embodiment shown in FIG. 1, the LED indicator 71 is lighted. The digital readout 25 of the caliper 20 is then reset or zeroed. At this point, the probe 30 can be lowered down into a hole or raised to the top of an object to be measured. When the probe 30 contacts the bottom of the hole or the top of the object to be measured, the circuit in FIG. 2 is closed through the object being measured and the indicator 71 is again activated. The digital read-out 25 provides the distance measured by the movement of the probe 30 from the surface 100 in either a positive (top of the object to be measure) or negative (bottom of the hole) direction.

Another embodiment is described in FIG. 3. The alternative embodiment depicted is an accessory attachment 15 for a caliper 20 with a probe 30 and measuring scale, preferably a digital read-out 25. In this alternative embodiment, the attachment port 80 is such that it can accept a variety of calipers. The means for affixing the caliper 20 is preferably a clamp screw 85. However, other affixing means such as those described above are acceptable.

The attachment port 80 can also be a notch 82 rather than a hole 87 as shown in FIG. 3. This alternative embodiment is depicted in FIG. 4. The caliper 20 is placed in the notch 82 of the attachment port 80. The notch 82 is closed by a latch 90 that is secured by a locking screw 92. A clamp screw 85 is then used to secure the caliper 20 to the latch 90.

The contact indicating circuit of FIG. 2, although very useful, is not necessary to the practice of the invention with the U-shaped structure. The embodiment of FIG. 4 does not use such an electrical indicating circuit. The operator, instead, ascertains probe 30 contact with the object to be measured and the surface 100 for zeroing and measuring purposes. This embodiment can be utilized in measuring non-conductive objects.

Alternatively, non-conductive objects can be measured with the embodiments of the invention of FIGS. 1 and 3 by using a conductive adapter. A conductive adapter of a known thickness is placed over the non-conductive object. The conductive adapter must be placed both under the contacts 65 and 75 and on the object to be measured for conductive continuity. The additional thickness under the contacts 65 and 75 will cancel out the thickness added by the conductive adapter to the object to be measured thus maintaining the integrity of the device's measurement. After the conductive adapter is put in place, the operation of the device is the same as described above.

In each of the above embodiments, the different positions and structures of the caliper probe-measuring device of the present invention are described separately in each of the embodiments. However, it is the full intention of the inventors of the present invention that the separate aspects of each embodiment described herein may be combined with the other embodiments described herein. Those skilled in the art will appreciate that adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A measuring device for measuring the height or depth of an electrically conductive element comprising:

a stabilizing body comprising a beam; at least one leg extending from said beam; a contact affixed to at least one leg, an electrical energy source connected in series with said contact; an indicator connected in series with said electrical source and said contact; and a caliper comprising a measuring scale; a probe, said probe connected in series with said contact, said electrical source, said indicator; and means for affixing the caliper to the beam;

whereby a circuit comprising the contact, the energy source, the indicator, and the probe is closed when the probe and the contact touch the electrically conductive element.

2. A measuring device as in claim 1 where the stabilizing body further comprises a resistor connected in series with the contact, the electrical energy source, the indicator, and the probe.

3. A measuring device as in claim 1 where the stabilizing body further comprises a switch for activation and deactivation of the indicator connected in series with the contact, the electrical energy source, the indicator, and the probe.

4. An attachment for a caliper for measuring an electrically conductive element, the attachment comprising:

a beam comprising an attachment port for the caliper, said attachment port having means for holding the caliper in electrical contact with the attachment port;

at least one leg extending from said beam;

a contact affixed to the leg and connected in series with said attachment port;

a resistor connected in series with the contact and said attachment port;

an electrical energy source connected in series with the contact, said attachment port, and said resistor;

an indicator connected in series with said electrical energy source, said resistor, said attachment port, and the contact; whereby the indicator is activated when a circuit comprising the contact, the resistor, the electrical energy source, the indicator and the attachment port is closed.

5. The attachment of claim 4 wherein the circuit also comprises a switch for activation and deactivation of the indicator.

* * * * *